United States Patent [19]

Bodyako et al.

[11] 4,326,116
[45] Apr. 20, 1982

[54] APPARATUS FOR ELECTRIC RESISTANCE HEATING AND COOLING TUBULAR WORKPIECES

[76] Inventors: Mikhail N. Bodyako, Leninsky prospekt, 76, kv. 105; Georgy A. Semenjuk, ulitsa Kharkovskaya, 74"B", kv. 22, both of Minsk; Garik E. Zverkov, ulitsa Oktyabrskoi revoljutsii, 24, kv. 40, Smolensk; Stanislav A. Astapchik, ulitsa Kalinovskogo, 56, kv. 79, Minsk; Anatoly F. Kosov, ulitsa Nikolaeva, 23, kv. 30, Smolensk; Sergei M. Kashulin, ulitsa Gorkogo, 143, kv. 151, Minsk; Alexandr N. Baklanov, prospekt Gagarina, 1, kv. 21, Smolensk, all of U.S.S.R.

[21] Appl. No.: 162,100

[22] Filed: Jun. 23, 1980

[51] Int. Cl.³ .................. B23K 37/04; C21D 9/08
[52] U.S. Cl. .................. 219/61.7; 219/61.1; 219/156; 219/160
[58] Field of Search .............. 219/59.1, 61.1, 61.7, 219/67, 156, 158, 159, 160

[56] References Cited

U.S. PATENT DOCUMENTS

| | | | |
|---|---|---|---|
| 2,931,892 | 4/1960 | Stich et al. | 219/156 |
| 3,418,447 | 2/1968 | Rizzolo et al. | 219/156 X |
| 3,644,695 | 2/1972 | Shuey, Jr. et al. | 219/59.1 X |
| 3,705,973 | 12/1972 | Balzer et al. | 219/156 |
| 3,743,778 | 7/1973 | Day | 219/156 |

FOREIGN PATENT DOCUMENTS 396377  8/1973  U.S.S.R.

Primary Examiner—Gene Z. Rubinson
Assistant Examiner—Keith E. George
Attorney, Agent, or Firm—McAulay, Fields, Fisher, Goldstein & Nissen

[57] ABSTRACT

An apparatus comprising a case with a carriage mounted on horizontal guides thereof which carriage supports two brackets provided with contact clamps. Under the brackets there is mounted a bath containing a cooling medium. At least one of the brackets is movable and is resiliently pressed in the direction opposite to the second bracket. A rod of a power cylinder is in contact with the movable bracket which rod serves only to put the brackets closer. The contact clamps are provided with mandrels to be inserted into a tubular workpiece.

5 Claims, 5 Drawing Figures

— 4,326,116 —

APPARATUS FOR ELECTRIC RESISTANCE HEATING AND COOLING TUBULAR WORKPIECES

BACKGROUND OF THE INVENTION

1. Field of the Invention

The present invention relates to a processing equipment intended for heat treatment of workpieces, and more particularly to an apparatus for electric resistance heating and cooling tubular products.

The invention may prove most advantageous in hardening, annealing, ageing and other kinds of heat treatment of thin-walled tubular products.

2. Description of the Prior Art

Though the process of electric resistance heating metal products has been known for a comparatively long time and has found a wide commercial application, thin-walled tubular workpieces are up to now heated in vacuum, muffle and induction furnaces. This is due to the fact that existing equipment intended for electric resistance heating does not ensure maintenance of geometric shape of a thinwalled tubular workpiece during its fixing and in the process of heat treatment as well.

In particular, known in the art is an apparatus for electric resistance heating elongated products, which apparatus comprises a case with rigidly fixed brackets provided with contact clamps (see E. N. Natanzon, G. M. Telnov, Elektronagrev method elektrosoprotivleniya i elektrovysadki, Izdatelstvo "Mashinostroyeniye". Moscow, 1964, p.79). This apparatus is designed for electric upsetting with a free metal deformation. In particular, the workpiece being heated gets elongated and while being set against a fixed bracket becomes deformed and is further upset. It will be understood that fixing brackets having contact clamps rigidly to the case eliminates the possibility of applying said apparatus for heat treatment of workpieces while maintaining the shape of the latter.

Known in the art is an apparatus for electric resistance heating and cooling tubular workpieces, which apparatus provides for compensating thermal elongation of the workpiece in the process of heating and cooling thereof (see USSR Inventor's Certificate No 396377). This apparatus comprises a case provided with vertical guides, a carriage mounted on said vertical guides, a drive for vertical movement mounted on the case and connected to said carriage, a horizontal guide fixed on the carriage, two brackets provided with contact clamps mounted on said carriage so that one of said brackets is movable and is mounted on said horizontal guide. A power cylinder is mounted on the carriage with a rod thereof being pivotally connected to the movable bracket. This power cylinder is designed to put the brackets closer and to bring them apart, and to compensate for linear elongation of the workpiece (i.e. to straighten and to elongate the workpiece in the process of heating). The contact clamps are blocks adapted to envelope the tubular workpiece from outside. A bath for a cooling medium is mounted on the case under the brackets.

The apparatus above described has found application in heat treatment of various tubular products having wall thickness of more than 1 mm. However, the attempts made to apply said apparatus for heating and cooling thin-walled tubular workpieces (wall thickness ranging from 0.06 to 0.3 mm) turned out to be ineffective. Thus, in spite of careful adjustment of the apparatus, geometric shape of the workpieces could not be maintained constant. Deformation of the workpieces took place during fixation thereof in the contact clamps, in the process of heating due to the thermal expansion, and during the cooling process. It appeared that to eliminate buckling of the thin-walled workpiece, a tensile force must be applied thereto, but the value of said force is within such a narrow range that even a very fine adjustment of the power cylinder system does not ensure observance of said range. Besides, in order to transmit said force to the tubular workpiece and to ensure a good electric contact, the contact clamps must be pressed rather hard to the workpiece. However, the thin-walled tubular workpiece immediately loses stability when pressed by the blocks.

SUMMARY OF THE INVENTION

An object of the present invention is to provide an apparatus for electric resistance heating and cooling thin-walled tubular workpieces.

Another object of the invention is to provide an apparatus offering electric resistance heating and cooling thin-walled tubular workpieces of various diameters and lengths.

A further object of the invention is to simplify the removal of a treated workpiece.

These and other objects of the invention are attained by providing an apparatus for electric resistance heating and cooling tubular workpieces comprising a case with vertical guides, a carriage mounted on said vertical guides, a drive for vertical movement mounted on the case and connected to the carriage, a horizontal guide fixed on the carriage, two brackets provided with contact clamps and assembled on said carriage so that at least one of said brackets is movable and is mounted on said horizontal guide, a power cylinder mounted on the carriage and connected to the movable bracket, and a bath for a cooling medium mounted on the case under the brackets, wherein, according to the invention, the movable bracket is resiliently pressed by means of a calibrated spring in the direction opposite to the second bracket, and the power cylinder serves only to put the brackets closer, while a rod thereof is in contact with a stop of the movable bracket, and contact clamps are provided with mandrels to be inserted into the tubular workpiece.

The elimination of a rigid coupling between the movable bracket and the rod of the power cylinder makes it possible to create, by means of the calibrated spring, a strictly defined tensile force applied to the workpiece. At the same time, the presence of the mandrels in the contact clamps allows this force to be transmitted to the workpiece without deformation thereof. Thus, the combination of the above features of the apparatus ensures the possibility of application thereof for electric resistance heating tubular products having the wall thickness of 0.06 to 1.0 mm.

In application of the apparatus for heat treatment of the tubular products having a diameter of up to 50 mm, the mandrels of the contact clamps are preferably expandable collets.

To ensure the possibility of treatment of the thin-walled tubular workpieces of various length, the stop of the movable bracket is preferably a screw.

The most compact and reliable in operation is the modification of the apparatus wherein the calibrated spring abuts a nut screwed on the horizontal guide.

To facilitate removal of a treated tubular workpiece, it is expedient that the second bracket is also movable, said bracket mounted on the horizontal guide and resiliently pressed by means of a calibrated spring in the direction opposite to the first bracket, and the stop thereof is in contact with the rod of an additional power cylinder.

BRIEF DESCRIPTION OF THE DRAWINGS

Now the invention will be understood from the following detailed description of specific modifications thereof with reference to the accompanying drawings in which.

DESCRIPTION OF THE PREFERRED EMBODIMENT

Figure 1:
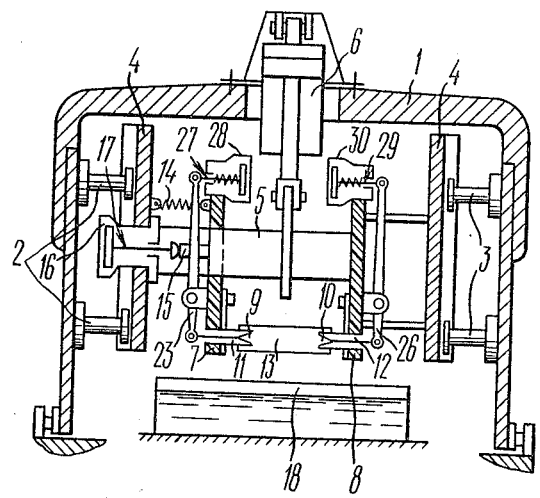
FIG. 1 is a kinematic diagram of an apparatus of the invention for electric resistance heating and cooling tubular workpieces.

An apparatus for electric resistance heating and cooling tubular workpieces comprises a case 1 (see FIG. 1 of the accompanying drawings) provided with vertical guides 2 and 3. The guides 2 and 3 may be of various shapes. In this case they are shafts stationarily fixed on the opposite walls of the case 1. On the vertical guides 2 and 3 there is mounted a carriage 4 with a horizontal guide 5 mounted thereon. The horizontal guide 5 and the carriage 4 are rigidly coupled with each other.

On the case 1 at the top portion thereof there is mounted a drive 6 for vertical movement connected to the carriage 4 by means of the horizontal guide 5.

On the carriage 4 there are mounted two brackets 7 and 8 each provided with a contact clamp 9 and 10 respectively. The contact clamps 9 and 10, according to the invention, are provided with respective mandrels 11 and 12 to be inserted into a tubular workpiece 13. The brackets 7 and 8 are assembled so that at least one bracket 7 is movable and is mounted on the horizontal guide 5. The second bracket 8 is rigidly coupled to the carriage 4. The movable bracket 7, according to the invention, is resiliently pressed by means of a calibrated spring 14 in the direction opposite to the second bracket 8. In this modification, a calibrated tension spring 14 coupling the movable bracket 7 with the carriage 4, is used for this purpose. Besides, the movable bracket 7 is provided with a stop 15.

On the carriage 4 there is mounted a power cylinder 16 connected to the movable bracket 7. For this purpose, according to the invention, a rod 17 of the power cylinder 16 is in contact with the stop 15 of the movable bracket 7. The power cylinder 16, according to the invention, serves only to put closer the movable bracket 7 and the stationary bracket 8.

On the case 1 under the brackets 7 and 8 there is mounted a bath 18 for a cooling fluid medium.

Figure 2:
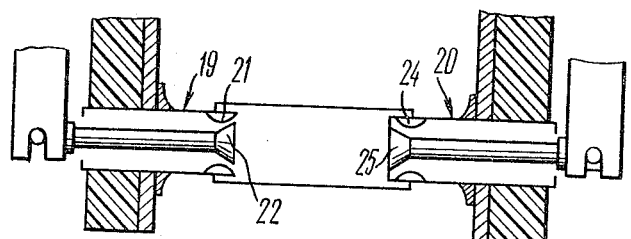
FIG. 2 is a modification of contact clamps which are expandable collets.

In application of the apparatus for electric resistance treatment of the tubular workpieces having a diameter of up to 50 mm, the mandrels 11 and 12 of the contact clamps 9 and 10, according to the invention, are preferably releasing spring sockets 19 and 20 (see FIG. 2 of the accompanying drawings).

The expandable collet 19 comprises a spring socket 21 and a cone 22 mounted therein, which cone is coupled to a corresponding arm of a double-arm lever 23 (see FIG. 1). The expandable collet 20 comprises a spring socket 24 and a cone 25 mounted therein, which cone is coupled to a corresponding arm of a double-arm lever 26.

The double-arm lever 23 is fixed on the movable bracket 7 and is connected to a rod 27 of a power cylinder 28. The double-arm lever 26 is fixed on the stationary bracket 8 and is connected to a rod 29 of a power cylinder 30.

Figure 3:
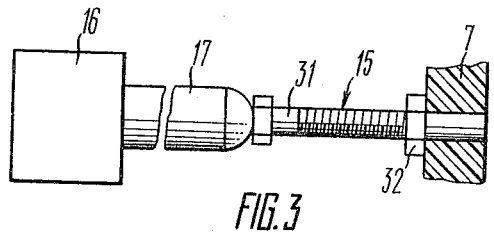
FIG. 3 is an adjustable stop of a movable bracket.

In application of the apparatus for heat treatment of the tubular workpieces having various length the stop 15 of the movable bracket 7 is preferably a screw 31 (FIG. 3). In this modification the cap of the screw 31 is in contact with the rod 17 of the power cylinder 16 while the threaded portion of the screw 31 enters a threaded opening of the movable bracket 7. The screw 31 is provided with a retaining nut 32.

Figure 4:
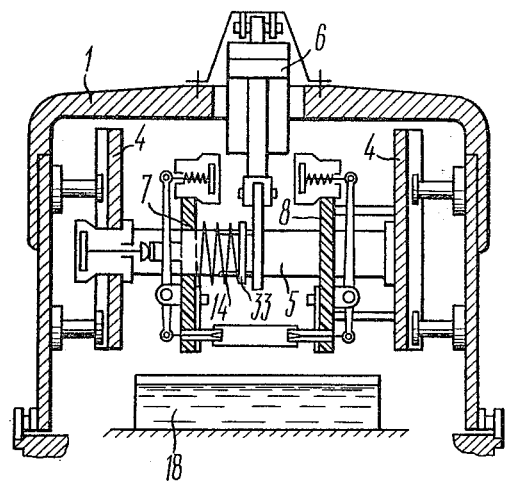
FIG. 4 is a modification of the apparatus of the invention provided with a calibrated pressure spring.

The most reliable in operation is such a modification of the apparatus of the present invention, wherein the calibrated spring 14 abuts with one end thereof a nut 33 screwed on the horizontal guide 5 while the other end thereof abuts the movable bracket 7 (FIG. 4). In this modification a calibrated pressure spring 14 is used.

Figure 5:
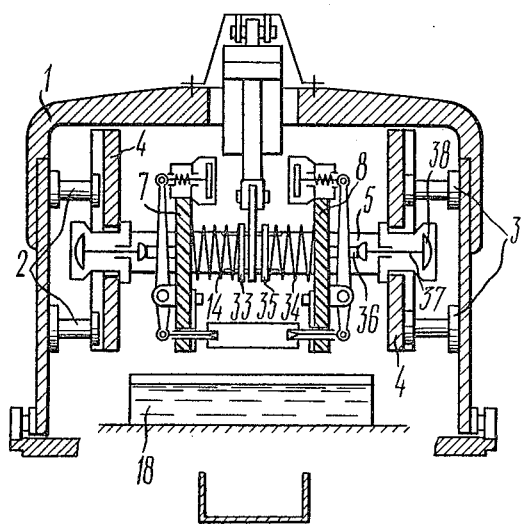
FIG. 5 is a modification of the apparatus of the invention provided with two movable brackets.

To facilitate the removal of the treated tubular workpieces, it is expedient to use the modification of the apparatus of the invention shown in FIG. 5 of the accompanying drawings. In this modification the second bracket 8, according to the invention, is also movable, mounted on the horizontal guide 5, and is resiliently pressed by means of a calibrated spring 34 in the direction opposite to the first bracket 7. In this case the calibrated pressure spring 34 is used with one end thereof abutting a nut 35 while the other end thereof abuts the movable bracket 8. Said movable bracket 8 is provided with a stop 36 which stop, according to the invention, is in contact with a rod 37 of an additional power cylinder 38 mounted on the carriage 4. The stop 36 can be made adjustable as above described.

The above apparatus operates as follows. The power cylinder 16 operates, and the rod 17 thereof while interacting with the stop 15, shifts the movable bracket 7 in the direction of the stationary bracket 8. The mandrels 11 and 12 enter the tubular workpiece 13. The power cylinders 28 and 30 operate thus turning the levers 23 and 26. Said levers 23 and 26 move the cones 22 and 25 which cones expand the spring sockets 21 and 24. The workpiece 13 is tightly fixed on the mandrels 11 and 12. The power cylinder 16 operates thus removing the rod 17 thereof from the stop 15.

Now the force of the calibrated spring 14 is taken in only by the tubular workpiece 13.

Electric power is supplied to the mandrels 9 and 10. The electric current passing through the workpiece 13 heats it up to a predetermined temperature. Then the drive 6 for vertical movement lowers the carriage 4. Such being the case, lower ends of the brackets 7 and 8 together with the workpiece 13 are dropped into the bath 18 containing a cooling fluid medium.

After the heat treatment is over, the drive 6 for vertical movement lifts the carriage 4 with the brackets 7 and 8. The power cylinders 28 and 30 operate thus turning levers 23 and 26 to the initial position. Said levers 23 and 26 shift the cones 22 and 25. The spring sockets 21 and 24 return to the initial state and the workpiece 13 gets released. At this moment the spring 14 also gets released thus removing the movable bracket 7 to the initial position. The operating cycle of the apparatus is further repeatedly carried out. In doing this the mechanisms operate as above described.

To readjust the apparatus for heat treatment of the tubular workpieces having different length the retaining nut 32 is released and the length of the stop 15 of the movable bracket 7 is set up by rotating the screw 31 (FIG. 3).

When readjusting the apparatus, if it is necessary to change the tensile force value, the nut 33 is rotated, thus varying the tightening force of the calibrated spring 14 (FIG. 4).

The modification of the apparatus shown in FIG. 5 of the accompanying drawings operates substantially as above described. However, simultaneously with the movement of the bracket 7 the additional power cylinder 38 shifts the bracket 8 in the opposite direction. After the workpiece 13 gets released from the spring sockets 19 and 20, the bracket 7 is removed by means of the calibrated spring 14, while the bracket 8 is removed by means of the calibrated spring 34.

While the invention has been described herein in terms of some specific embodiments, numerous variations may be made in the apparatus without departing from the spirit and scope of the invention as set forth in the appended claims.

What is claimed is:

1. An apparatus for electric resistance heating and cooling tubular workpieces comprising:
a case;
vertical guides mounted on said case;
a carriage mounted on said vertical guides;
a drive for vertical movement mounted on said case and connected to said carriage;
a horizontal guide fixed on said carriage;
two brackets of which at least one is movable, is mounted on said horizontal guide and is provided with a stop;
a calibrated spring resiliently pressing said movable bracket in the direction opposite to the other of said other of brackets;
contact clamps fixed on said brackets and provided with mandrels to be inserted into the tubular workpiece;
a power cylinder mounted on said case and serving only to put said brackets closer for which purpose a rod thereof is in contact with said stop of said movable bracket;
a bath for a cooling medium mounted on said case under said brackets.

2. An apparatus as set forth in claim 1, wherein said mandrels of said contact clamps are expandable collets.

3. An apparatus as set forth in claim 1, wherein said stop of said movable bracket is a screw.

4. An apparatus as set forth in claim 1, wherein said calibrated spring abuts a nut screwed on said horizontal guide.

5. An apparatus as set forth in claim 1, 2, 3, or 4, wherein the second bracket is also movable, is mounted on said horizontal guide and is resiliently pressed by means of the calibrated spring in the direction opposite to the first bracket while the stop thereof is in contact with a rod of an additional power cylinder.

* * * * *